US 8,752,090 B2

(12) United States Patent
Casey et al.

(10) Patent No.: US 8,752,090 B2
(45) Date of Patent: Jun. 10, 2014

(54) CONTENT SYNDICATION TO SET TOP BOX THROUGH IP NETWORK

(75) Inventors: Steven M. Casey, Littleton, CO (US); Kurt Campbell, Lafayette, CO (US); Gnanasegeran Selvadurai, Lafayette, CO (US)

(73) Assignee: Qwest Communications International Inc., Denver, CO (US)

( * ) Notice: Subject to any disclaimer, the term of this patent is extended or adjusted under 35 U.S.C. 154(b) by 532 days.

(21) Appl. No.: 12/147,652

(22) Filed: Jun. 27, 2008

(65) Prior Publication Data

US 2009/0007176 A1    Jan. 1, 2009

Related U.S. Application Data

(63) Continuation-in-part of application No. 11/291,274, filed on Nov. 30, 2005.

(51) Int. Cl.
*G06F 3/00* (2006.01)
*H04N 7/10* (2006.01)
*H04N 7/173* (2011.01)

(52) U.S. Cl.
USPC .................. 725/39; 725/33; 725/51; 725/59; 725/87; 725/105

(58) Field of Classification Search
USPC ......... 725/1–2, 4, 33, 39, 50, 59, 86–87, 100, 725/105, 108, 110, 112, 131, 144, 151
See application file for complete search history.

(56) References Cited

U.S. PATENT DOCUMENTS

| | | |
|---|---|---|
| 5,191,410 A | 3/1993 | McCalley et al. |
| 5,289,371 A | 2/1994 | Abel et al. |
| 5,600,573 A | 2/1997 | Hendricks et al. |
| 5,659,653 A | 8/1997 | Diehl et al. |
| 5,790,935 A | 8/1998 | Payton |
| 5,918,013 A | 6/1999 | Mighdoll et al. |
| 5,945,988 A | 8/1999 | Williams et al. |
| 6,035,038 A | 3/2000 | Campinos et al. |
| 6,173,316 B1 | 1/2001 | De Boor et al. |
| 6,237,031 B1 | 5/2001 | Knauerhase et al. |
| 6,256,691 B1 | 7/2001 | Moroz et al. |
| 6,536,041 B1 | 3/2003 | Knudson et al. |

(Continued)

FOREIGN PATENT DOCUMENTS

WO    WO 2005091626    9/2005

OTHER PUBLICATIONS

Grumet, Andrew, "Hack: RSS Powered Tivo to-Do Lists," http://grumet.net/writing/programmer/syndication/rss-powered-tivo-todo-lists, 6 pages, Jul. 14, 2005.

(Continued)

*Primary Examiner* — Gigi L Dubasky
(74) *Attorney, Agent, or Firm* — Swanson & Bratschun, L.L.C.

(57) ABSTRACT

Tools are provided for supporting content syndication to a set top box. The set top box requests a syndicated feed at regularly scheduled times, and receives the syndicated feed through an Internet Protocol ("IP") network. Hence, a syndicated feed is distributed to the set top box that subscribes to the syndicated feed. Additionally, the set top box converts the syndicated feed for use by the set top box, and causes at least one image based at least in part on the syndicated feed to be displayed on a display device for a user.

24 Claims, 4 Drawing Sheets

(56) References Cited

U.S. PATENT DOCUMENTS

| | | |
|---|---|---|
| 6,698,020 B1 | 2/2004 | Zigmond et al. |
| 6,741,684 B2 | 5/2004 | Kaars |
| 7,089,309 B2 | 8/2006 | Ramalay et al. |
| 7,103,906 B1 | 9/2006 | Katz et al. |
| 7,120,702 B2 | 10/2006 | Huang et al. |
| 7,165,725 B2 | 1/2007 | Casey |
| 7,386,871 B1 | 6/2008 | Knudson et al. |
| 7,444,658 B1 | 10/2008 | Matz et al. |
| 7,454,709 B1 | 11/2008 | Appelman |
| 7,568,209 B1 | 7/2009 | Addington et al. |
| 7,592,912 B2 * | 9/2009 | Hasek et al. .......... 340/539.16 |
| 7,654,462 B2 | 2/2010 | Casey |
| 8,015,167 B1 * | 9/2011 | Riggs et al. ................ 707/705 |
| 8,583,758 B2 | 11/2013 | Casey et al. |
| 8,621,531 B2 | 12/2013 | Casey et al. |
| 2001/0011284 A1 | 8/2001 | Humpleman et al. |
| 2001/0047517 A1 | 11/2001 | Christopoulos et al. |
| 2002/0016919 A1 | 2/2002 | Sims |
| 2002/0016971 A1 | 2/2002 | Berezowski et al. |
| 2002/0026645 A1 | 2/2002 | Son et al. |
| 2002/0049977 A1 | 4/2002 | Miller et al. |
| 2002/0056109 A1 | 5/2002 | Tomsen |
| 2002/0069223 A1 | 6/2002 | Goodisman et al. |
| 2002/0069420 A1 | 6/2002 | Russell et al. |
| 2002/0075332 A1 | 6/2002 | Geilfuss et al. |
| 2002/0104099 A1 | 8/2002 | Novak |
| 2002/0118954 A1 | 8/2002 | Barton et al. |
| 2002/0144279 A1 | 10/2002 | Zhou |
| 2002/0188945 A1 | 12/2002 | McGee et al. |
| 2003/0009765 A1 | 1/2003 | Linden et al. |
| 2003/0018971 A1 * | 1/2003 | McKenna, Jr. ................ 725/40 |
| 2003/0050062 A1 | 3/2003 | Chen et al. |
| 2003/0086023 A1 | 5/2003 | Chung et al. |
| 2003/0098869 A1 | 5/2003 | Arnold et al. |
| 2003/0145331 A1 | 7/2003 | Escobar et al. |
| 2003/0149975 A1 | 8/2003 | Eldering et al. |
| 2003/0149988 A1 | 8/2003 | Ellis et al. |
| 2003/0193484 A1 | 10/2003 | Lui et al. |
| 2003/0226142 A1 | 12/2003 | Rand |
| 2004/0008972 A1 | 1/2004 | Haken |
| 2004/0024702 A1 * | 2/2004 | Angel et al. ................ 705/40 |
| 2004/0039781 A1 | 2/2004 | LaVallee et al. |
| 2004/0088558 A1 | 5/2004 | Candelore |
| 2004/0111756 A1 | 6/2004 | Stuckman et al. |
| 2004/0117248 A1 | 6/2004 | Dutta et al. |
| 2004/0117831 A1 | 6/2004 | Ellis et al. |
| 2004/0143620 A1 | 7/2004 | Fisher et al. |
| 2005/0010635 A1 | 1/2005 | Schwesig et al. |
| 2005/0021414 A1 | 1/2005 | Liebenow |
| 2005/0034171 A1 | 2/2005 | Benya |
| 2005/0047752 A1 | 3/2005 | Wood et al. |
| 2005/0060759 A1 | 3/2005 | Rowe et al. |
| 2005/0102385 A1 | 5/2005 | Muhonen et al. |
| 2005/0108769 A1 | 5/2005 | Arnold et al. |
| 2005/0130685 A1 | 6/2005 | Jankin |
| 2005/0143136 A1 | 6/2005 | Lev et al. |
| 2005/0155063 A1 | 7/2005 | Bayrakeri et al. |
| 2005/0195978 A1 | 9/2005 | Babic et al. |
| 2005/0198290 A1 | 9/2005 | Berkey et al. |
| 2005/0210507 A1 | 9/2005 | Hawkins et al. |
| 2005/0216594 A1 | 9/2005 | O'Brien et al. |
| 2005/0262540 A1 * | 11/2005 | Swix et al. .................. 725/90 |
| 2005/0262542 A1 | 11/2005 | DeWeese et al. |
| 2005/0273833 A1 | 12/2005 | Soinio |
| 2006/0046744 A1 | 3/2006 | Dublish et al. |
| 2006/0143481 A1 | 6/2006 | Morten |
| 2006/0168123 A1 | 7/2006 | Krstulich |
| 2006/0205434 A1 | 9/2006 | Tom et al. |
| 2006/0265427 A1 | 11/2006 | Cohen et al. |
| 2006/0271652 A1 | 11/2006 | Stavrakos et al. |
| 2006/0280303 A1 | 12/2006 | Gupte |
| 2006/0282304 A1 | 12/2006 | Bedard et al. |
| 2007/0083901 A1 | 4/2007 | Bond |
| 2007/0088850 A1 | 4/2007 | Alperin et al. |
| 2007/0121651 A1 | 5/2007 | Casey et al. |
| 2007/0121856 A1 | 5/2007 | Alperin et al. |
| 2007/0121940 A1 | 5/2007 | Park et al. |
| 2007/0124416 A1 | 5/2007 | Casey et al. |
| 2007/0124769 A1 | 5/2007 | Casey et al. |
| 2007/0124779 A1 | 5/2007 | Casey |
| 2007/0124781 A1 | 5/2007 | Casey et al. |
| 2007/0130155 A1 | 6/2007 | Alperin et al. |
| 2007/0130340 A1 | 6/2007 | Alperin et al. |
| 2007/0192807 A1 * | 8/2007 | Howcroft ...................... 725/86 |
| 2007/0239833 A1 | 10/2007 | Alperin et al. |
| 2007/0239880 A1 | 10/2007 | Alperin et al. |
| 2007/0239895 A1 | 10/2007 | Alperin et al. |
| 2007/0240065 A1 | 10/2007 | Alperin et al. |
| 2007/0271532 A1 | 11/2007 | Nguyen et al. |
| 2008/0098442 A1 | 4/2008 | Greenbaum |
| 2008/0181189 A1 | 7/2008 | Yoo |
| 2008/0184297 A1 | 7/2008 | Ellis et al. |
| 2008/0279215 A9 | 11/2008 | Wendling et al. |
| 2009/0007171 A1 | 1/2009 | Casey et al. |
| 2009/0063645 A1 | 3/2009 | Casey et al. |
| 2009/0252329 A1 | 10/2009 | Casey et al. |
| 2010/0333153 A1 * | 12/2010 | Sahota et al. .................. 725/97 |
| 2012/0272260 A1 | 10/2012 | Casey et al. |

OTHER PUBLICATIONS

Ortikon Interactive Ltd., "Ortikon ACE IPTV Middleware," 8 pages, no date.

IBM Research, "Intermediares and Transcoding" http://web.archive.org/web/20021219072117/http://www.almaden.ibm.com/cs/wbi/wbi-an, 2 pages, Oct. 8, 2008.

Television is coming to a cell phone near you. Http://pd.pennet.com/Articles/Article_Display.cfm?Section=Articles&Subsection=Display&ARTICLE_ID; dated Jul. 20, 2004, 4 pages.

Sony Portable TV & MPEG4 recorder, htt;://www.icube.us/sony_msv-al/product_overview.htm, dated Jul. 20, 2004, 1 page.

dynamism.com, Sony MSV-A1—Portable TV, http://www.dynamism.com/msv-al/, dated Jul. 20, 2004, 1 page.

Xvision Systems, Play and Convert your media files; mp3, wav, asf, avi, mpg and more . . . , About MPG, MPEG-4, http://www.svonline.com/xfiles,about_mpg.htm, dated Oct. 28, 2004, 2 pages.

U.S. Appl. No. 12/147,665, Office Action dated Jun. 25, 2010, 26 pages.

U.S. Appl. No. 11/291,274, Office Action dated Aug. 18, 2010, 38 pages.

U.S. Appl. No. 11/291,806, Office Action dated Oct. 28, 2008, 34 pages.

U.S. Appl. No. 11/291,806, Final Rejection dated Apr. 29, 2009, 32 pages.

U.S. Appl. No. 11/291,325, Office Action, dated Oct. 22, 2008, 101 pages.

U.S. Appl. No. 11/291,325, Final Rejection, dated Apr. 1, 2009, 36 pages.

U.S. Appl. No. 11/291,324, Final Office Action, dated Apr. 22, 2009, 21 pages.

U.S. Appl. No. 11/291,324, Office Action dated Nov. 12, 2009, 21 pages.

U.S. Appl. No. 11/291,324, Office Action, dated Oct. 28, 2008, 16 pages.

U.S. Appl. No. 11/291,324, Final Rejection, dated May 26, 2010, 22 pages.

U.S. Appl. No. 11/060,222, Office Action dated Oct. 19, 2005, 10 pages.

U.S. Appl. No. 11/060,222, Office Action dated Jan. 24, 2006, 10 pages.

U.S. Appl. No. 11/060,222, Office Action dated Jun. 15, 2006, 11 pages.

U.S. Appl. No. 11/060,222, Notice of Allowance, dated Nov. 17, 2006, 3 pages.

U.S. Appl. No. 11/060,222, Notice of Allowability, dated Nov. 17, 2006, 4 pages.

U.S. Appl. No. 11/291,326, Office Action dated Oct. 14, 2008, 19 pages.

U.S. Appl. No. 11/291,326, Final Rejection dated Feb. 24, 2009, 17 pages.

(56) References Cited

OTHER PUBLICATIONS

U.S. Appl. No. 11/291,326, Office Action dated Jul. 13, 2009, 19 pages.
U.S. Appl. No. 11/291,326, Final Rejection dated Jan. 22, 2010, 23 pages.
U.S. Appl. No. 12/147,565, Final Rejection dated Dec. 3, 2010, 32 pages.
U.S. Appl. No. 12/147,674, Office Action dated Dec. 22, 2010, 41 pages.
U.S. Appl. No. 11/291,274, Final Office Action dated Feb. 15, 2011, 46 pages.
U.S. Appl. No. 11/291,274, Office Action dated Jul. 19, 2011, 42 pages.
U.S. Appl. No. 12/061,046, Non-Final Office Action dated Apr. 28, 2011, 22 pages.
U.S. Appl. No. 12/147,674, Office Action dated Jun. 15, 2011, 42 pages.
U.S. Appl. No. 12/061,046; Notice of Allowance dated Apr. 2, 2012; 35 pages.
U.S. Appl. No. 12/061,046; Supplemental Notice of Allowability dated Apr. 19, 2012; 5 pages.
U.S. Appl. No. 12/147,674; Non-Final Rejection dated May 10, 2012: 59 pages.
U.S. Appl. No. 11/291,324; Non Final Office Action dated Jan. 3, 2012; 32 pages.
U.S. Appl. No. 11/291,274; Non Final Office Action dated Jan. 10, 2012; 45 pages.
U.S. Appl. No. 11/291,324; Final Rejection dated Jul. 26, 2012; 28 pages.
U.S. Appl. No. 11/291,274, Non-Final Rejection dated Aug. 21, 2012; 55 pages.
U.S. Appl. No. 12/061,046, Issue Notification dated Jul. 18, 2012; 1 page.
U.S. Appl. No. 11/291,326; Non-Final Rejection dated Sep. 14, 2012; 47 pages.
U.S. Appl. No. 11/291,326, Final Rejection dated Nov. 29, 2012; 40 pages.
U.S. Appl. No. 12/147,674; Final Rejection dated Oct. 19, 2012; 63 pages.
U.S. Appl. No. 11/291,326; Notice of Allowance dated Jul. 9, 2013; 35 pages.
U.S. Appl. No. 11/291,274; Notice of Allowance and Examiner Initiated Interview Summary received dated Aug. 22, 2013; 52 pages.
U.S. Appl. No. 11/291,324; Non-Final Rejection dated Oct. 3, 2013; 38 pages.
U.S. Appl. No. 11/291,274, Final Rejection dated Mar. 20, 2013; 54 pages.
U.S. Appl. No. 11/291,274; Issue Notification dated Dec. 11, 2013; 1 page.
U.S. Appl. No. 11/291,326; Issue Notification dated Oct. 23, 2013; 1 page.
U.S. Appl. No. 12/147,674; Non-Final Rejection dated Jan. 2, 2014; 65 pages.
U.S. Appl. No. 13/539,712; Non-Final Office Action dated Dec. 9, 2013; 27 pages.
U.S. Appl. No. 11/291,324; Final Rejection dated Apr. 9, 2014; 39 pages.
U.S. Appl. No. 13/539,712; Notice of Allowance dated Apr. 14, 2014; 21 pages.

\* cited by examiner

CONTENT SYNDICATION TO SET TOP BOX THROUGH IP NETWORK

CROSS-REFERENCE TO RELATED APPLICATIONS

The present disclosure may be related to the following commonly assigned applications/patents of which the entire disclosure of each is incorporated herein by reference: U.S. patent application Ser. No. 12/147,665, filed on Jun. 27, 2008 by Casey et al. and entitled "SYSTEM AND METHOD FOR SUPPORTING MESSAGING USING A SET TOP BOX"; U.S. patent application Ser. No. 12/061,046, filed on Apr. 2, 2008 by Casey et al. and entitled "IPTV FOLLOW ME CONTENT SYSTEM AND METHOD"; and U.S. patent application Ser. No. 12/147,674, filed on Jun. 27, 2008 by Casey et al. and entitled "DYNAMIC INTERACTIVE ADVERTISEMENT INSERTION INTO CONTENT STREAM DELIVERED THROUGH IP NETWORK".

This application is a continuation-in-part of co-pending U.S. patent application Ser. No. 11/291,274 filed Nov. 30, 2005 entitled "REAL-TIME ON DEMAND SERVER," which is hereby incorporated by reference, as if set forth in full in this document, for all purposes.

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to content distribution, and more particularly, to supporting content syndication to a set top box.

BACKGROUND

In existing television distribution systems, a content update is pushed to all set top boxes in the distribution network. For example, in a cable TV system, information update that is made available electronically is sent from a master controller to a set top box. However, this is highly restrictive because each set top box can only receive the same update as every other set top box. Additionally, it may be difficult to ensure that all set top boxes receive the content update because of problems including communication difficulties with some set top boxes.

Some deficiencies of existing systems can be illustrated with the distribution of Electronic Programming Guides. In existing systems, a large file containing programming information of all channels is pushed to all set top boxes. However, this results in inefficiencies because many set top boxes are not authorized to display many of the channels and hence have no use for much of the contents of the large file. Additionally, because the large file must be distributed to all set top boxes, the network's bandwidth limitation necessitates that the distribution be performed only during hours when there is low network usage. However, when there is a subsequent update to the programming information, the update often can no longer be distributed because the network usage is no longer low at a later hour.

Moreover, the existing systems cannot be easily adapted to distribute other types of content that may be of interest to a particular user. For example, even if the existing system could be adapted to push a second large file in addition to the large file containing programming information, it is not desirable for the second large file to contain billing statements. One user's billing statement is different from another user's. Sending every user's billing statement to every user's set top box is a sheer waste of bandwidth and can raise security and privacy concerns.

Hence, there is a need for improved content distribution to a set top box.

BRIEF SUMMARY

Embodiments of the invention provide novel tools (including, without limitation, systems, methods and software) for supporting content syndication to a set top box. In an aspect, content syndication comprises the set top box subscribing to a syndicated feed in which the set top box periodically requests the syndicated feed, causing the syndicated feed to be distributed to the set top box. Advantageously, such embodiments allow the set top box to pull individualized content updates that are of interest to a user of the set top box. Additionally, because each set top box is responsible for pulling content updates, it is less difficult to ensure that all set top boxes receive the content updates even if there may be periods of communication difficulties with some set top boxes.

Merely by way of example, in accordance with one set of embodiments, a set top box requests programming information of only the channels that are of interest to a user. Beneficially, each set top box makes such request at scheduled times and the scheduled times may be different from one set top box to another. Because the requests made by all set top boxes are likely staggered and the requested programming information is likely smaller, it would no longer be necessary for a content distribution to be performed only during hours when there is low network usage. Rather, a subsequent update to the programming information can be readily distributed. Optionally, the set top box can request other types of syndicated feeds or a syndicated feed based on a user input.

The tools provided by various embodiments of the invention include, without limitation, methods, systems, and/or software products. Mainly by way of example, a method might comprise one or more procedures, any or all of which are executed by a computer system. Correspondingly, an embodiment might comprise a computer system configured with instructions to perform one or more procedures in accordance with methods provided by various embodiments. Similarly, a computer program might comprise a set of instructions that are executable by a computer system (and/or a processor therein) to perform such operations. In many cases, such software programs are encoded on physical and/or tangible computer readable media (such as, merely by way of example, optical media, magnetic media, and/or the like).

In one set of embodiments, a method of supporting content syndication to a set top box might includes requesting, at the set top box, a syndicated feed at regularly schedule times. The syndicated feed might be distributed to the set top box that subscribes to the syndicated feed. The method might also include receiving, at the set top box, the syndicated feed through an Internet Protocol ("IP") network. Additionally, the method might include converting the syndicated feed for use by the set top box and/or displaying at least one image based at least in part on the syndicated feed on a display device for a user. In certain embodiments, the syndicated feed might be formatted as an XML document. In some embodiments, the set top box might comprise a user's list of syndicated feeds. In one embodiment, the set top box might be pre-configured to subscribe to at least one syndicated feed, and the at least one syndicated feed might be a syndicated feed in the user's list of syndicated feeds. In another embodiment, the user's list of syndicated feeds might include a location from which each syndicated feed in the user's list of syndicated feeds could be requested, and a location can include a primary location and an alternate location. In other embodiments, the method might include providing a user interface for the user to select a syndicated feed from a list of syndicated feeds, the list of syndicated feeds might comprise: a first syndicated feed that comprises a billing statement, a second syndicated feed that comprises an Internet based web feed and is distributed publicly, a third syndicated feed that comprises an Electronic Programming Guide, a fourth syndicated feed that comprises a video feed, a fifth syndicated feed that comprises an audio feed, a sixth syndicated feed that comprises a video feed and an audio feed, and a seventh syndicated feed that comprises an alert.

In another set of embodiments, a method of supporting content syndication to a set top box might include requesting, at the set top box, a syndicated feed at regularly schedule times. The syndicated feed might be distributed to the set top box that subscribes to the syndicated feed. The method might also include receiving, at the set top box, the syndicated feed through an Internet Protocol ("IP") network. Additionally, in some embodiments, the method includes converting the syndicated feed for use by the set top box and/or causing at least one image based at least in part on the syndicated feed to be displayed on a display device for a user.

In yet another set of embodiments, a device for receiving a syndicated feed might comprise a processor and a computer readable medium in communication with the processor. In an aspect, the computer readable medium might have encoded thereon a set of instructions executable by the device to perform one or more operations. Merely by way of example, in some embodiments, the set of instructions might include instructions for requesting the syndicated feed at regularly scheduled time; instructions for receiving, at the device, the syndicated feed through an Internet Protocol ("IP") network; instructions for converting, at the device, the syndicated feed for use by the device; and/or instructions for causing at least one image to be displayed on a display device for a user, wherein the at least one image is based at least in part on the syndicated feed. In some embodiments, such a device might be incorporated within a larger distribution system, which might further include the display device and/or a master controller.

BRIEF DESCRIPTION OF THE DRAWINGS

A further understanding of the nature and advantages of particular embodiments may be realized by reference to the remaining portions of the specification and the drawings wherein like reference numerals are used throughout the several drawings to refer to similar components. In some instances, a sublabel is associated with a reference numeral to denote one of multiple similar components. When reference is made to a reference numeral without specification to an existing sublabel, it is intended to refer to all such multiple similar components.

DETAILED DESCRIPTION

While various aspects and features of certain embodiments have been summarized above, the following detailed description illustrates a few exemplary embodiments in further detail to enable one of skill in the art to practice such embodiments. In the following description, for the purposes of explanation, numerous specific details are set forth in order to provide a thorough understanding of the described embodiments. It will be apparent, however, to one skilled in the art that other embodiments of the present invention may be practiced without some of these specific details. In other instances, well-known structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

In one aspect, embodiments of the invention give a content distributor a facility to support content syndication to a set top box through an IP network. As used herein, the term "content syndication" broadly describes the content distributor making available a syndicated feed, thereby allowing the set top box to subscribe to the syndicated feed. The term "syndicated feed" broadly describes data (or data format/data type) or a reference/hyperlink to data (or data format/data type) for providing updated content. Depending on context, the term "syndicated feed" might have other meanings. For example, a list of syndicated feeds might not include a list of actual data or reference/hyperlink to data. Rather, if a syndicated feed in the list of syndicated feeds is subscribed to, data that corresponds to the syndicated feed might then be received by a set top box in an embodiment. The data or a format of the data might all be referred to as the syndicated feed in this embodiment. In another embodiment, the data might contain a reference/hyperlink, and a type of the data available through the reference/hyperlink might also be referred to as the syndicated feed. Typically, a syndicated feed is formatted as an XML document. Advantageously, the subscription model allows the set top box to pull the syndicated feed by requesting the syndicated feed periodically at scheduled times, causing the content distributor to distribute the syndicated feed to the set top box.

In accordance with various embodiments of the invention, the set top box might be any device that connects to a display device and an external signal, converting the external signal to be displayed on the display device. In a typical environment, a set top box might receive the external signal from a television distribution system, including a cable television system, a satellite television system, an xDSL television system and/or the like. In a particular set of embodiments, as described in further detail below, the set top box is configured to receive signals via an IP network (which might include, but is not limited to, the Internet). The user might be a person or several persons who use the set top box. The syndicated feed might include any content available for the set top box to subscribe to, or might include a reference/hyperlink to any such content. A syndicated feed might include, without limitation, a list of available syndicated feeds, a billing statement, Internet-based web feeds (e.g., Really Simply Syndication ("RSS") feeds, web pages, etc.), Electronic Programming Guides, Pay-Per-View and/or Video-On-Demand programming, other audio and/or video feeds, or news alerts. As will be appreciated by those of skill in the art, to support load distribution or in case a primary location is unavailable, a syndicated feed might be supported by one or more alternate locations from which a set top box could request the syndicated feed. Accordingly, a location of a syndicated feed might in fact comprise one or more additional locations as alternates. It is also noted that alternatively and/or additionally, any of a number of known load balancing techniques, including request redirection, server clustering, and/or the like, might be implemented.

Figure 1:
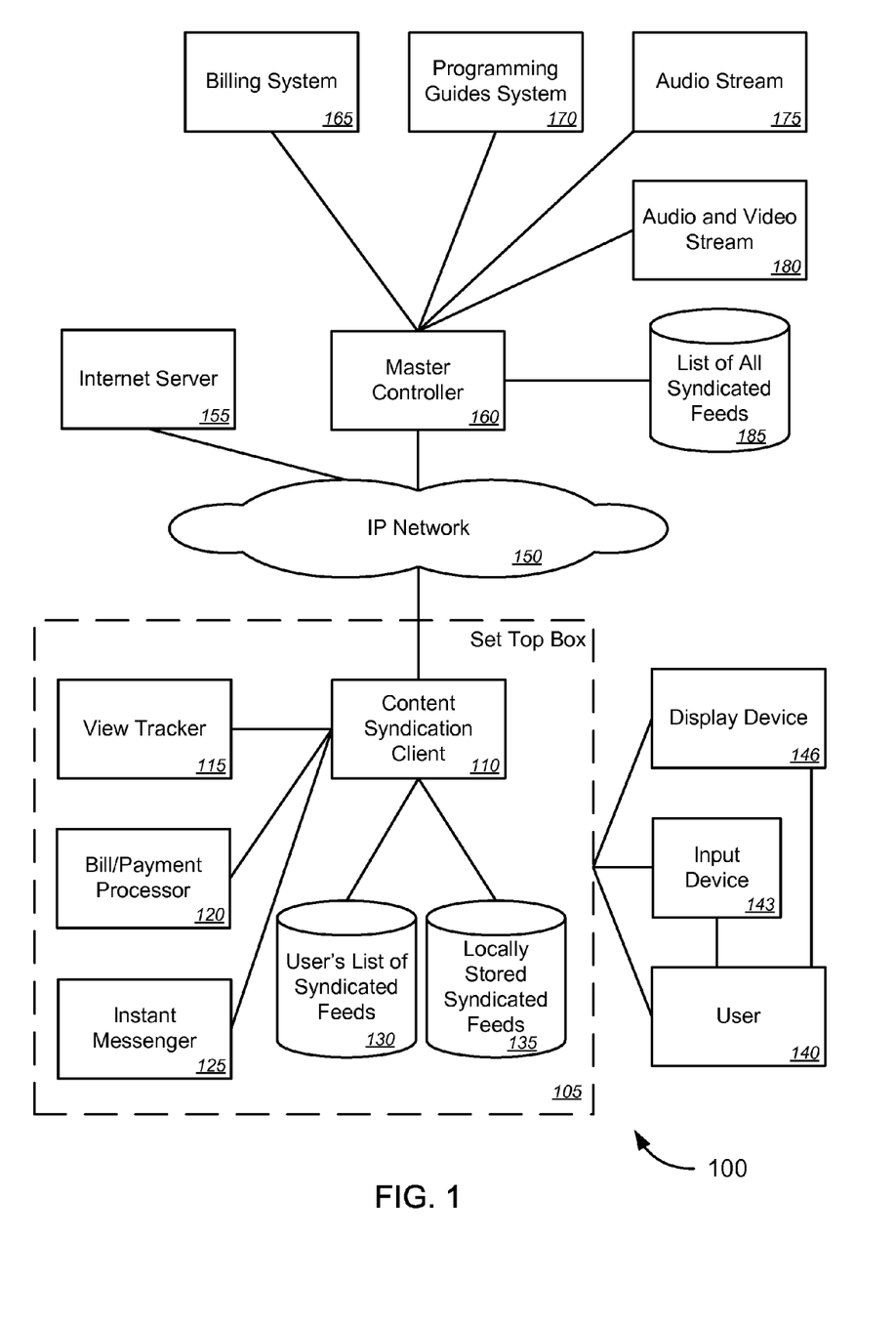
FIG. 1 is a block diagram illustrating a system for distributing content, in accordance with various embodiments of the invention.

FIG. 1 illustrates an exemplary system 100 for distributing content. It should be noted that, for descriptive purposes, the illustrated system 100 includes various elements that may not be included in certain embodiments of the invention. A set top box 105 is connected to an input device 143, a display device 146, and an IP network 150. Through the IP network 150, the set top box 105 is connected to an Internet server 155 and a master controller 160. A user 140 uses the set top box 105 to view various contents that are displayed on the display device 146. Additionally, the user 140 is allowed to use the input device 143 to control various aspects of the set top box 105. The master controller 160 is connected to a billing system 165, programming guides system 170, an audio stream 175, an audio and video stream 180, and a list of all syndicated feeds 185. These elements are described in greater detail as follows.

The set top box 105 comprises a content syndication client 110, which interacts with a view tracker 115, a bill/payment processor 120, and an instant messenger 125, all residing in the set top box 105. The content syndication client 110 is also connected to a user's list of syndicated feeds 130, locally stored syndicated feeds 135, and the IP network 150. Various other components of the set top box 105 allow the user 140, via a user interface, to use the set top box 105 to view contents that are displayed on the display device 146.

The content syndication client 110 supports various aspects of content syndication at the set top box 105. The content syndication client 110 is responsible for receiving various input by the user 140. For example, in some embodiments, the content syndication client 110 might provide a user interface for the user 140 to modify the user's list of syndicated feeds 130 as will be explained in greater detail. The user's list of syndicated feeds 130 includes syndicated feeds that are subscribed to by the user, and might be stored on a storage device that is the same as the locally stored syndicated feeds 135 or another storage device. The content syndication client 110 is also responsible for requesting each syndicated feed in the user's list of syndicated feeds 130 at scheduled times through the IP network 150. As will be appreciated by those skilled in the art, in some embodiments, the user 140 might be able to specify the intervals and/or actual times of the scheduled times via a user interface. For example, the user 140 might be able to specify that a syndicated feed should be requested every six hours and/or at 6 a.m. and 8 p.m. The user 140 might also be able to specify additional information, for example a day of a week or a day of a month.

Subsequently, the content syndication client 110 is responsible for receiving each requested syndicated feed through the IP network 150. After receiving a syndicated feed, the content syndication client 110 might store the syndicated feed as one of the locally stored syndicated feeds 135 on a storage device in some embodiments. The content syndication client 110 might then retrieve the syndicated feed from the locally stored syndicated feeds 135 and convert the syndicated feed for use by the set top box 105 and/or to be displayed. In some embodiments, the content syndication client 110 might also directly convert the syndicated feed without storing the syndicated feed first. The view tracker 115 tracks whether a portion of the syndicated feed has been viewed by the user 140. For example, a portion of the syndicated feed that has been displayed on the display device 146 might be considered as having been viewed by the user 140. Additionally, a user interface might be provided to allow the user 140 to mark a portion of the syndicated feed as having been viewed. In certain embodiments, the view tracker 115 might store this tracking information on the same storage device as the locally stored syndicated feeds 135 or another storage device.

In some cases, the set-top box 105 provides a user interface that enables the user 140 to interact with various components of the set-top box 105, including without limitation the content syndication client 110 and the view tracker 115. These components or parts of these components, along with other components including the input device 143 and the display device 146 in some embodiments, together form a user interface. Accordingly, the user interface might comprise one or more menus, one or more windows or dialog boxes, and/or one or more input or display fields, etc. In some embodiments, the user interface is configured to cause an image to be displayed on the display device 146 for the user 140, for example, by sending signals to the display device 146 (e.g., a television, etc.) that is in communication with the set top box 105. The image that is displayed might be based at least in part on a syndicated feed, and in some instances the image might comprise at least a portion of the syndicated feed. Merely by way of example, in some cases, the image might be a set of text from a portion of a syndicated feed. In other cases, the image might be a part of a video program referenced by, or from a portion of, a syndicated feed.

Additionally, in an embodiment, the user interface also comprises the input device 143 for providing input to the set top box 105. Exemplary input devices might include, but are not limited to, a remote control, a remote keyboard, and/or a remote pointing device including a trackball, mouse, etc. that receive input from the user 140. Merely by way of example, in some cases, the user interface might allow the user 140 to mark a portion of a syndicated feed as having been viewed with a remote trackball; this input might be tracked by the view tracker 115. In another case, the user interface might allow the user 140 to modify the user's list of syndicated feeds 130, or to specify a location from which a syndicated feed could be requested with a remote keyboard. In other cases, the user interface might allow the user 140 to use a remote control to indicate which syndicated feed that the user 140 would like to view, or to take other actions including to watch a video program referenced by a syndicated feed.

The bill/payment processor 120 interacts with the content syndication client 110 in some embodiments. In such embodiments, the content syndication client 110 might request a syndicated feed comprising a billing statement of the user 140 through the IP network 150 from the master controller 160. The billing statement might require additional processing by the bill/payment processor 120, for example decryption and/or additional formatting in some embodiments, before the content syndication client 110 converts the billing statement to be displayed. As will be appreciated by those of skill in the art, the bill/payment processor 105 might enable the user 140 to pay a bill securely at the set top box 105 in some embodiments. Accordingly, the bill/payment processor 120 might then relay the payment information back to the master controller 150. Additionally, those skilled in the art will appreciate that a billing statement might not be updated as frequently as the rest of syndicated feeds; hence the billing statement might be requested based on a schedule that is different from the overall schedule in some embodiments. Some embodiments might also extend such feature to allow each syndicated feed, in addition to the billing statement, to be requested at its own scheduled times.

In some embodiments, the instant messenger 125 allows the content syndication client 110 to notify the user 140 when a syndicated feed contains an update. For example, the user 140 might be notified with an indication on a remote control, for example with an LED that is lit and/or with scrolling text in an LCD panel. The user 140 might then press a button on the remote control to view the update right away. The user 140 might also be notified by causing an update message to be superimposed on a portion of a screen on the display device 146. Alternatively, a video signal to be displayed on the display device 146 might be resized and/or shifted to accommodate the update message. The update message might be a summary of the update. Additionally, in certain embodiments, the instant messenger 125 might support such feature without using the user interface as described above. Accordingly, the user 140 might be notified even if the user 140 is not situated right by the set top box 105 and/or the display device 146. For example, in some embodiments, the user 140 might be notified by a wireless phone or an Internet based instant messaging client. It will be understood by those skilled in the art that an instant message might be sent from the instant messenger 125 to the master controller 160 and/or the Internet server 155 rather than directly to the wireless phone or the Internet based instant messaging client.

The IP network 150 is a network based on, without limitation, Internet Protocol versions 4 ("IPv4") or 6 ("IPv6"). In some embodiments, the content syndication client 110 might request a syndicated feed from the Internet server 155 through the IP network 150. In such embodiments, the syndicated feed might include an Internet based web feed that is distributed publicly to any other client on the Internet. Such Internet based web feed might be, without limitation, Atom 1.0, Atom 0.3, Really Simple Syndication (RSS 2.0), RDF Site Summary (RSS 1.0 and RSS 0.90), or Rich Site Summary (RSS 0.91).

The content syndication client 110 might request other types of syndicated feeds from the master controller 160 through the IP network 150. As note above, in some embodiments, one type of syndicated feed might include a billing statement. The master controller 160 might provide this type of syndicated feed by accessing the billing system 165 for the user 140. Likewise, when the bill/payment processor 115 relays the payment information back to the master controller 160 in some embodiments as noted above, the master controller 160 might relay the information back to the billing system 165.

As will be described in greater detail below, the master controller 160 might also provide an Electronic Programming Guide by accessing the programming guides system 170 in some embodiments. Additionally, the master controller 160 might provide various types of multimedia syndicated feeds by retrieving their content in certain embodiments from the audio stream 175, the audio and video stream 180, and/or other sources. Moreover, the master controller 160 might access the list of all syndicated feeds 185 in order to provide a list of available syndicated feeds in some embodiments. The master controller 160 might further support other types of syndicated feeds in some embodiments by accessing other databases.

In some embodiments, the system might be adapted to support automated video recording. In such embodiments, the content syndication client 105 requests, at scheduled times, from the master controller 160 whether there is a video that should be recorded. Consequently, the content syndication client 110 might receive, as part of a syndicated feed, a video recording instruction from the master controller 160. The content syndication client 110 might transmit the video recording instruction to a digital video recorder in some embodiments. In some embodiments, the set top box 105 might itself comprise a digital video recorder. The set top box 105 might cause an indicator to be displayed on the display device 150 that video recording is in progress.

Figure 2:
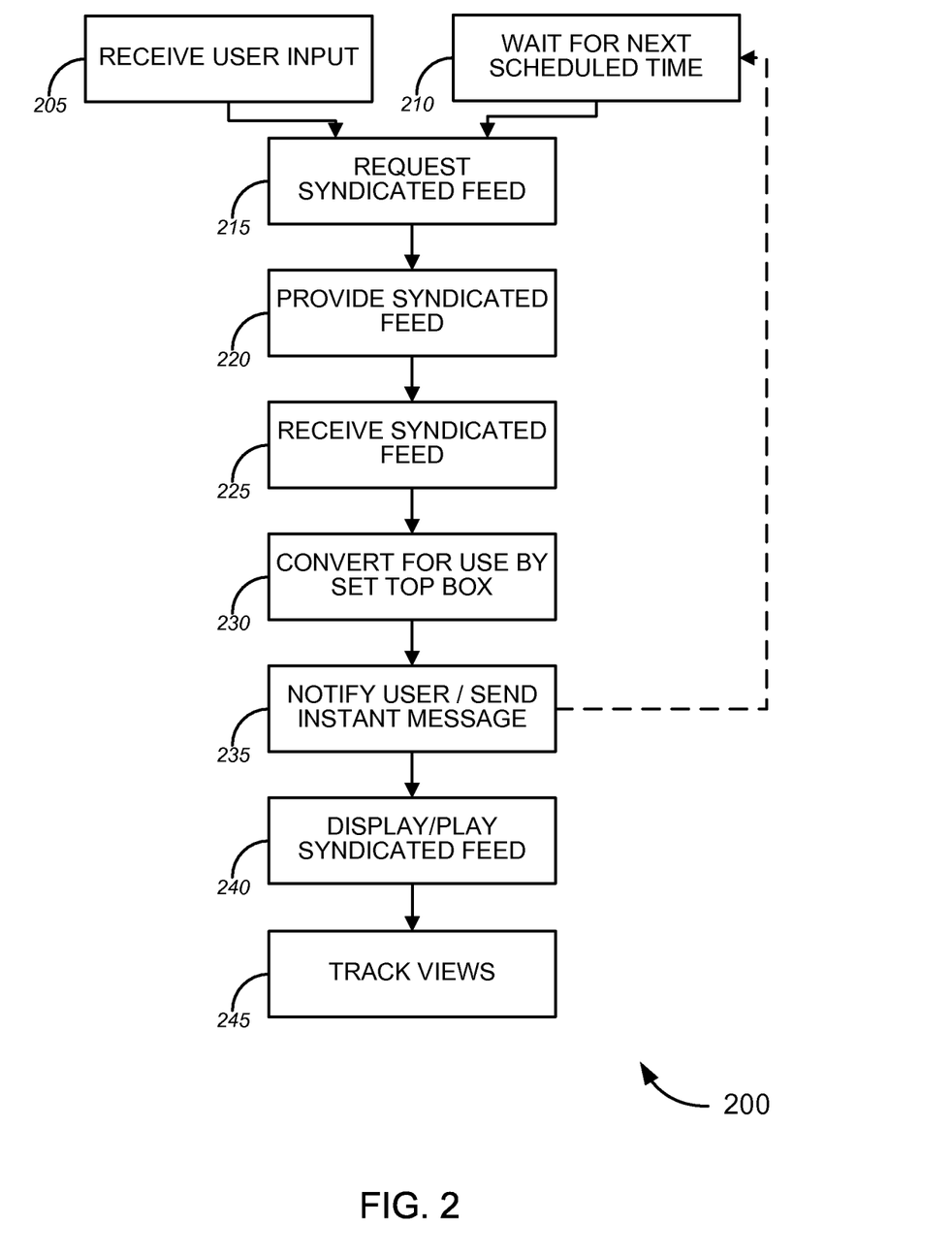
FIG. 2 is a process flow diagram illustrating a method of supporting content syndication to a set top box, in accordance with various embodiments of the invention.

FIG. 2 illustrates a method 200 of supporting content syndication to a set top box, in accordance with certain embodiments of the invention. In some cases, the method 200 can be implemented by a system, for example the system 100 described above. It should be appreciated, however, that the system 100 of FIG. 1 may operate in a manner different than the method of FIG. 2; likewise, it should be understood that the method 200 of FIG. 2 may be implemented using any type of system and therefore is not limited to implementation in the system 100 of FIG. 1 (or any particular structural arrangement, for that matter).

In some embodiments, the method 200 comprises, at block 205, receiving a user input, e.g., via the user interface as described above. Typically, the set top box is pre-configured to subscribe to at least one syndicated feed by including the at least one syndicated feed in the user's list of syndicated feeds. In some embodiments, the user might be provided with a user interface to change, add/subscribe, or delete/unsubscribe syndicated feeds in the user's list of syndicated feeds. As will be appreciated by those of skill in the art, the user is often eager to view a newly subscribed syndicated feed right away. In such embodiments, in addition to requesting syndicated feeds at regularly scheduled times as noted above, the content syndication client is responsible to also request a syndicated feed at block 215 immediately after receiving a user input to subscribe to the syndicated feed. In some embodiments, the user might also have the option of not requesting the newly subscribed syndicated feed right away, but rather waiting until the next scheduled time.

Some embodiments might support various ways to allow the user to enter one or more syndicated feeds that the set top box should subscribe to. In some embodiments, the user might be provided with a user interface to enter, as a text string, a location from which a syndicated feed could be requested. Alternatively and/or in addition, the user might be able to select, via a user interface, from a list of syndicated feeds with detailed information about the syndicated feeds already specified in some embodiments. In such embodiments, the content syndication client might receive the list of syndicated feeds through the IP network from the master controller. The list of syndicated feeds might comprise a description of each syndicated feed and a location from which the content syndication client could request each syndicated feed. Consequently, the user can specify a syndicated feed without needing to enter the syndicated feed's location. The syndicated feed that is selected is added to the user's list of syndicated feeds.

After receiving the user input, or after having waited for the next scheduled time at block 210, the content syndication client requests the syndicated feed at block 215 in some embodiments. Upon receiving the request, the master controller or the Internet server provides the syndicated feed back to the content syndication client at block 220. The content data might be included in the syndicated feed, embedded into the syndicated feed, and/or subsequently obtained by accessing a reference, for example a hyperlink in the syndicated feed. In some embodiments, the RSS enclosure feature or a similar feature might be used to embed the content data into the syndicated feed. It will be understood by those skilled in art that to embed the content data, a reference, for example a hyperlink to the content data, might be used. If a file format of the content data is recognized in certain embodiments, the embedded content data might be downloaded automatically through the reference. If the embedded content data is downloaded automatically, the downloaded content data might be displayed for the user when the user desires to view the content data. It is noted that although the RSS enclosure feature is generally directed to multimedia content (e.g., an audio and/or video file), this or a similar feature might be used for any other type of content data including, without limitation, an image, text, application, billing statement, and/or Electronic Programming Guide. Additionally, as will be described in greater detail, a reference might point to the master controller, while another reference might point to a server other than the master controller. Likewise, while a reference might point to the Internet server, another reference might point to a server other than the Internet server.

As noted above, in some embodiments, one type of syndicated feed might include a billing statement. The master controller might provide this type of syndicated feed by accessing the billing system for the user, obtaining the necessary data, and formatting the data as part of a syndicated feed. For example, the billing system might include a database, and a record of the user might be selected from the database. A previous balance and detailed charges for a current period might be part of the record of the user. In one embodiment, the previous balance and detailed charges might then be formatted into an XML document in accordance with a schema. It is noted that a wide variety of document formats might be used, and a document format might describe a meaning of each piece of data, while another document format might describe how each piece of data should be displayed. The XML document might itself constitute a syndicated feed, or be encrypted before being transmitted as part of a syndicated feed.

In some embodiments, another type of syndicated feed might include an Electronic Programming Guide. The master controller might provide this type of syndicated feed by accessing the programming guides system. For example, the programming guide system might include a database, and the database is accessed. In some embodiments, the master controller might retrieve programming information of only the channels that are of interest to the user and/or that the set top box is authorized to display. In such embodiments, the amount of information that needs to be transferred is advantageously reduced compared to having to send one large file with programming information of all channels. For example, a particular set of data might be selected from the database based on the user's interest. The particular set of data, which might include date, time, and program description, might then be formatted into an XML document as a syndicated feed. Other document formats including those noted above might also be used.

The master controller might also provide various types of multimedia syndicated feeds in certain embodiments. These types of multimedia syndicated feeds might include, without limitation, Pay-Per-View programming, Video-On-Demand programming, audio and/or video feeds. As noted above, a syndicated feed might contain a reference, for example a hyperlink rather than streaming data, and the streaming data might be embedded into the syndicated feed (e.g., by using the RSS enclosure feature in some embodiments) or subsequently obtained by accessing the reference. In certain embodiments, the master controller might retrieve the content of these multimedia syndicated feeds from the audio stream, the audio and video streams, and/or other sources and provide these multimedia syndicated feeds for streaming to the set top box. For example, the audio and video stream of a Pay-Per-View program might reside on a storage device local to the master controller. Accordingly, the Pay-Per-View program content is retrieved by the master controller and streamed to the set-top-box. In other embodiments, references are provided by the master controller and these multimedia syndicated feeds are streamed to the set top box from their respective sources based on the references. For example, a source for an audio feed might be an Internet server, and the audio feed is streamed from the Internet server that is provided in a hyperlink.

In some embodiments, in order to provide a list of available syndicated feeds with detailed information about the syndicated feeds already specified, the master controller might access the list of all syndicated feeds. In some embodiments, the master controller might also perform additional processing such that only those syndicated feeds that are accessible by the set top box are sent to the set top box. For example, the billing system might include a database that specifies accessibility relationships between syndicated feeds and each programming package that is subscribed to by the users. Additionally, the database might specify which syndicated feeds have been directly subscribed to by the users. Accordingly, suppose the user of the set top box has subscribed to programming package XYZ plus syndicated feed F, and syndicated feeds A through D are accessible to subscribers of programming package XYZ, the syndicated feeds that are accessible by the set top box would be A through D plus F. Conversely, suppose the user has subscribed to a programming package that does not include the present syndicated feed feature, no syndicated feed from the master controller would be accessible by the set top box. Nevertheless, the user might still be able access those syndicated feeds that are pre-configured into the set top box, including being able to access a billing statement as part of a syndicated feed.

The master controller might support other types of syndicated feeds in some embodiments, for example, by accessing other databases. In certain embodiments, these other types of syndicated feeds might include text, graphics, and/or alerts relating to news, weather, sports, or stock quotes. In some embodiments, the types of syndicated feeds might also include a result of a search by the master controller of databases that are accessible by the master controller. For example, in some embodiments, the master controller might perform a personalized search for a list of programming content that is available for the set top box to display.

At block 225, the content syndication client receives the syndicated feed provided by the master controller or the Internet server. The content syndication client might optionally store the syndicated feed as one of the locally stored syndicated feeds in some embodiments. At block 230, the content syndication client then might convert the syndicated feed for use by the set top box and/or to be displayed. In some embodiments, the content syndication client might perform the conversion in accordance with a user preference. For example, in some embodiments, the content syndication client might retrieve a list of preferred programming channels and a layout that is modifiable by the user, then format an Electronic Programming Guide in accordance with the list of preferred programming channels and the layout.

The instant messenger might notify or send an instant message to the user at block 235. As noted above, a notification might be indicated on a remote control and/or displayed on the display device. Alternatively or in addition, an instant message might be sent to a wireless phone or an Internet based instant messaging client. The instant messenger might be instructed in some embodiments that there is an update based on the tracking information provided by the view tracker as described above. In some embodiments, the content syndication client might also instruct the instant messenger that there is an update based on a comparison between a newly requested syndicated feed and the syndicated feed that was previously stored among the locally stored syndicated feeds (or upon otherwise detecting the presence of new data in the newly requested syndicated feed). Additionally, in some embodiments, the content syndication client might instruct the instant messenger that the newly requested syndicated feed itself contains an alert, in which case the instant messenger might provide the alert to the user. As noted above, some types of syndicated feeds might include alerts relating to news, weather, sports, or stock quotes. For example, the user might have specified that an alert should be sent when a stock trades at a particular price. Accordingly, after the particular price is reached, an alert is retrieved by the set top box as part of a syndicated feed, and the alert is then sent to the user. The content syndication client then waits at block 210 for the next schedule time before requesting the syndicated feed again at block 215.

At block 240, the set top box causes at least one image to be displayed on the display device for the user. For example, the set top box might send signals to the display device, thereby causing the display device to display the at least one image. The at least one image is based at least in part on the syndicated feed. In some cases, this image might comprise at least a portion of a syndicated feed. Merely by way of example, if the syndicated feed comprises a video stream, an image displayed by the display device might comprise a frame of that video stream (in other words, the set top box might cause the display device to display a plurality of images in sequence, i.e., to display the video stream). In other cases, the image might be a portion of a video stream (or a still image, etc.) that is referenced by the syndicated feed (e.g., the syndicated feed might comprise a reference to a video program, and the set top box might cause the display of one or more images that are incorporated within the video program). For an audio feed, an audio stream based at least in part on the audio feed is played, and the at least one image (e.g., an image with a song title) is associated with the audio stream. The audio stream that is played might be a part of an audio stream referenced by, or from a portion of, the audio feed.

At block 245, the view tracker tracks whether a portion of the syndicated feed has been viewed by the user. In some embodiments, the tracking information might instruct the content syndication client how to convert a syndicated feed to be displayed. In such embodiments, a content that has already been viewed might be displayed in a different color. In some embodiments, the tracking information might also allow the view tracker to analyze the behavior of the user in order to improve services and/or generate additional revenues in the future.

Figure 3:
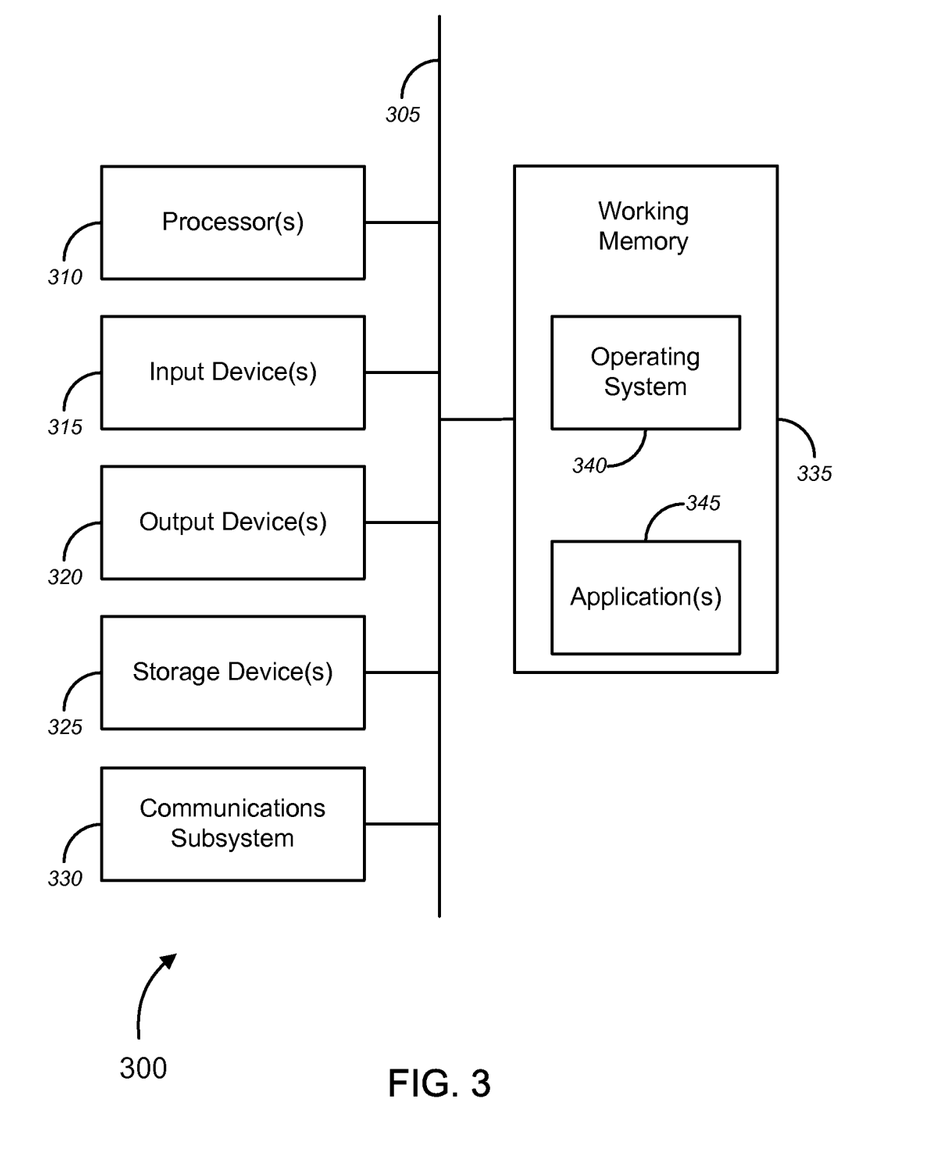
FIG. 3 is a generalized schematic diagram illustrating a computer system, in accordance with various embodiments of the invention.

FIG. 3 provides a schematic illustration of one embodiment of a computer system 300 that can perform the methods provided by various other embodiments, as described herein, and/or can function as the master controller, set top box, and/or Internet server. It should be noted that FIG. 3 is meant only to provide a generalized illustration of various components, any or all of which may be utilized as appropriate. FIG. 3, therefore, broadly illustrates how individual system elements may be implemented in a relatively separated or relatively more integrated manner.

The computer system 300 is shown comprising hardware elements that can be electrically coupled via a bus 305 (or may otherwise be in communication, as appropriate). The hardware elements may include one or more processors 310, including without limitation one or more general-purpose processors and/or one or more special-purpose processors (such as digital signal processing chips, graphics acceleration processors, and/or the like); one or more input devices 315, which can include without limitation a mouse, a keyboard and/or the like; and one or more output devices 320, which can include without limitation a display device, a printer and/or the like.

The computer system 300 may further include (and/or be in communication with) one or more storage devices 325, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 300 might also include a communications subsystem 330, which can include without limitation a modem, a network card (wireless or wired), an infra-red communication device, a wireless communication device and/or chipset (such as a Bluetooth™ device, an 802.11 device, a WiFi device, a WiMax device, cellular communication facilities, etc.), and/or the like. The communications subsystem 330 may permit data to be exchanged with a network (such as the network described below, to name one example), other computer systems, and/or any other devices described herein. In many embodiments, the computer system 300 will further comprise a working memory 335, which can include a RAM or ROM device, as described above.

The computer system 300 also can comprise software elements, shown as being currently located within the working memory 335, including an operating system 340, device drivers, executable libraries, and/or other code, such as one or more application programs 345, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer readable storage medium, such as the storage device(s) 325 described above. In some cases, the storage medium might be incorporated within a computer system, such as the system 300. In other embodiments, the storage medium might be separate from a computer system (i.e., a removable medium, such as a compact disc, etc.), and or provided in an installation package, such that the storage medium can be used to program, configure and/or adapt a general purpose computer with the instructions/code stored thereon. These instructions might take the form of executable code, which is executable by the computer system 300 and/or might take the form of source and/or installable code, which, upon compilation and/or installation on the computer system 300 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 300) to perform methods in accordance with various embodiments of the invention. According to a set of embodiments, some or all of the procedures of such methods are performed by the computer system 300 in response to processor 310 executing one or more sequences of one or more instructions (which might be incorporated into the operating system 340 and/or other code, such as an application program 345) contained in the working memory 335. Such instructions may be read into the working memory 335 from another computer readable medium, such as one or more of the storage device(s) 325. Merely by way of example, execution of the sequences of instructions contained in the working memory 335 might cause the processor(s) 310 to perform one or more procedures of the methods described herein.

The terms "machine readable medium" and "computer readable medium," as used herein, refer to any medium that participates in providing data that causes a machine to operation in a specific fashion. In an embodiment implemented using the computer system 300, various computer readable media might be involved in providing instructions/code to processor(s) 310 for execution and/or might be used to store and/or carry such instructions/code (e.g., as signals). In many implementations, a computer readable medium is a physical and/or tangible storage medium. Such a medium may take many forms, including but not limited to, non-volatile media, volatile media, and transmission media. Non-volatile media includes, for example, optical and/or magnetic disks, such as the storage device(s) 325. Volatile media includes, without limitation, dynamic memory, such as the working memory 335. Transmission media includes, without limitation, coaxial cables, copper wire and fiber optics, including the wires that comprise the bus 305, as well as the various components of the communication subsystem 330 (and/or the media by which the communications subsystem 330 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 310 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 300. These signals, which might be in the form of electromagnetic signals, acoustic signals, optical signals and/or the like, are all examples of carrier waves on which instructions can be encoded, in accordance with various embodiments of the invention.

The communications subsystem 330 (and/or components thereof) generally will receive the signals, and the bus 305 then might carry the signals (and/or the data, instructions, etc. carried by the signals) to the working memory 335, from which the processor(s) 305 retrieves and executes the instructions. The instructions received by the working memory 335 may optionally be stored on a storage device 325 either before or after execution by the processor(s) 310.

Figure 4:
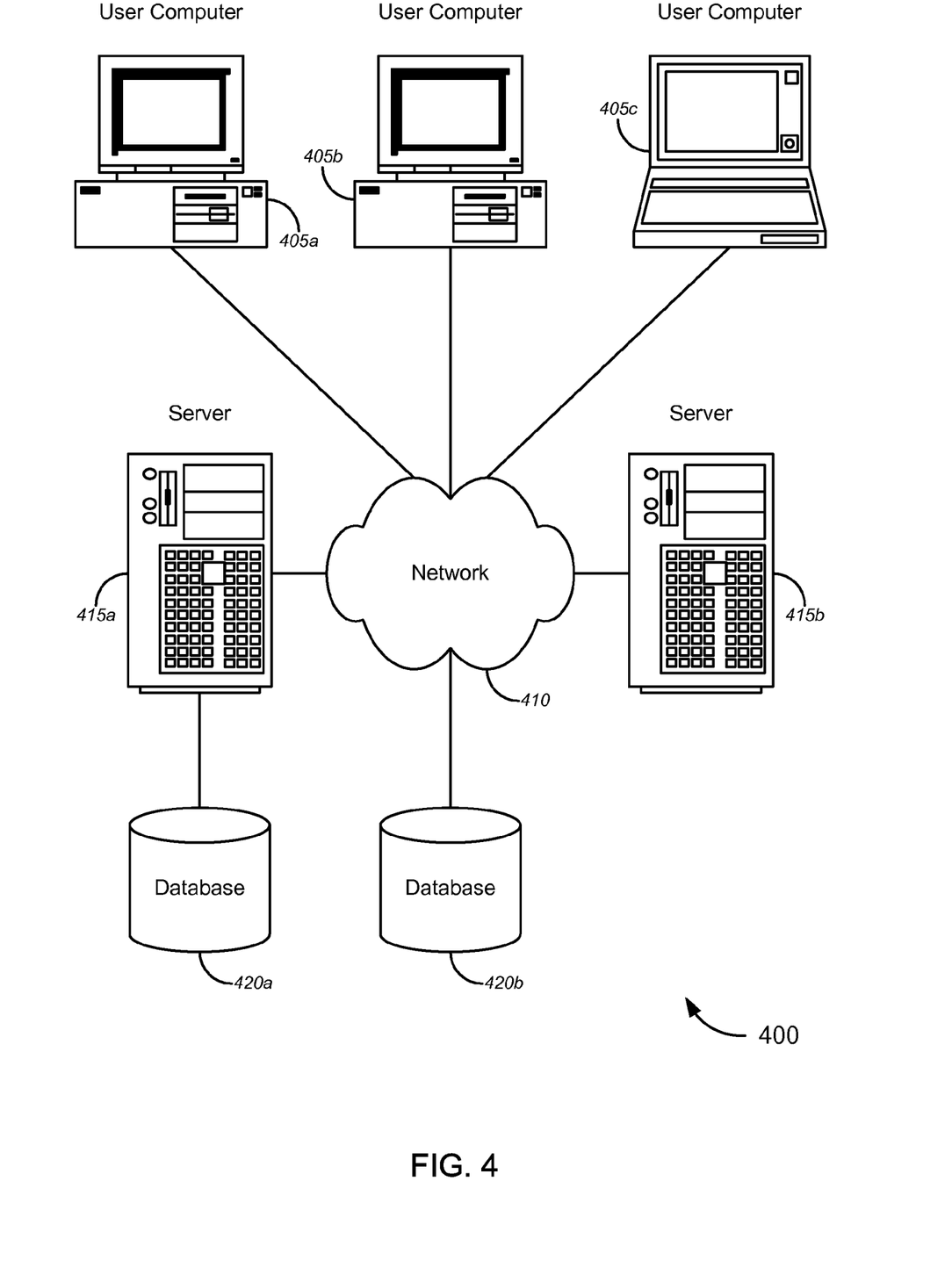
FIG. 4 is a block diagram illustrating a networked system of computers, which can be used in accordance with various embodiments of the invention.

A set of embodiments comprises systems for supporting content syndication to a set top box. Merely by way of example, FIG. 4 illustrates a schematic diagram of a system 400 that can be used in accordance with one set of embodiments. The system 400 can include one or more user computers 405. The user computers 405 can be general purpose personal computers (including, merely by way of example, personal computers and/or laptop computers running any appropriate flavor of Microsoft Corp.'s Windows™ and/or Apple Inc.'s Macintosh™ operating systems) and/or workstation computers running any of a variety of commercially-available UNIX™ or UNIX-like operating systems. These user computers 405 can also have any of a variety of applications, including one or more applications configured to perform methods provided by various embodiments (as described above, for example), as well as one or more office applications, database client and/or server applications, and/or web browser applications. Alternatively, the user computers 405 can be any other electronic device, such as a thin-client computer, Internet-enabled mobile telephone, and/or personal digital assistant, capable of communicating via a network (e.g., the network 410 described below) and/or displaying and navigating web pages or other types of electronic documents. Although the exemplary system 400 is shown with three user computers 405, any number of user computers can be supported.

Certain embodiments of the invention operate in a networked environment, which can include a network 410. The network 410 can be any type of network familiar to those skilled in the art that can support data communications using any of a variety of commercially-available (and/or free or proprietary) protocols, including without limitation TCP/IP, SNA, IPX, AppleTalk, and the like. Merely by way of example, the network 410 can be a local area network ("LAN"), including without limitation an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments of the invention can include one or more server computers 415. Each of the server computers 415 may be configured with an operating system, including without limitation any of those discussed above, as well as any commercially (or freely) available server operating systems. Each of the servers 415 may also be running one or more applications, which can be configured to provide services to one or more clients 405 and/or other servers 415.

Merely by way of example, one of the servers 415 may be a web server, which can be used, merely by way of example, to process requests for web pages or other electronic documents from user computers 405. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 405 to perform methods of the invention.

The server computers 415, in some embodiments, might include one or more application servers, which can be configured with one or more applications accessible by a client running on one or more of the client computers 405 and/or other servers 415. Merely by way of example, the server(s) 415 can be one or more general purpose computers capable of executing programs or scripts in response to the user computers 405 and/or other servers 415, including without limitation web applications (which might, in some cases, be configured to perform methods provided by various embodiments). Merely by way of example, a web application can be implemented as one or more scripts or programs written in any suitable programming language, such as Java™, C, C#™ or C++, and/or any scripting language, such as Perl, Python, or TCL, as well as combinations of any programming and/or scripting languages. The application server(s) can also include database servers, including without limitation those commercially available from Oracle, Microsoft, Sybase™, IBM™ and the like, which can process requests from clients (including, depending on the configuration, dedicated database clients, API clients, web browsers, etc.) running on a user computer 405 and/or another server 415. Data provided by an application server may be formatted as one or more web pages (comprising HTML, Javascript, etc., for example) and/or may be forwarded to a user computer 405 via a web server (as described above, for example). Similarly, a web server might receive web page requests and/or input data from a user computer 405 and/or forward the web page requests and/or input data to an application server. In some cases a web server may be integrated with an application server.

In accordance with further embodiments, one or more servers 415 can function as a file server and/or can include one or more of the files (e.g., application code, data files, etc.) necessary to implement various disclosed methods, incorporated by an application running on a user computer 405 and/or another server 415. Alternatively, as those skilled in the art will appreciate, a file server can include all necessary files, allowing such an application to be invoked remotely by a user computer 405 and/or server 415.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 420. The location of the database(s) 420 is discretionary: merely by way of example, a database 420*a* might reside on a storage medium local to (and/or resident in) a server 415*a* (and/or a user computer 405). Alternatively, a database 420*b* can be remote from any or all of the computers 405, 415, so long as it can be in communication (e.g., via the network 410) with one or more of these. In a particular set of embodiments, a database 420 can reside in a storage-area network ("SAN") familiar to those skilled in the art. (Likewise, any necessary files for performing the functions attributed to the computers 405, 415 can be stored locally on the respective computer and/or remotely, as appropriate.) In one set of embodiments, the database 435 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while various functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. A method of supporting content syndication to a set top box, wherein a syndicated feed is distributed to the set top box that subscribes to the syndicated feed, the method comprising:

requesting, at the set top box, the syndicated feed at scheduled times; receiving, at the set top box, the syndicated feed through an Internet Protocol ("IP") network;

converting, at the set top box, the syndicated feed for use by the set top box; displaying at least one image on a display device for a user, wherein the at least one image is based at least in part on the syndicated feed;

wherein the syndicated feed is formatted as an XML document;

wherein the set top box comprises the user's list of syndicated feeds;

wherein the set top box is pre-configured to subscribe to at least one syndicated feed, the at least one syndicated feed being the syndicated feed in the user's list of syndicated feeds;

wherein the user's list of syndicated feeds comprises, for at least one of the syndicated feeds, a primary location from which the at least one syndicated feed can be requested and an alternate location from which the at least one syndicated feed can be requested if the at least one syndicated feed is not available at the primary location;

providing a user interface for the user to select the syndicated feed from the user's list of syndicated feeds, the user's list of syndicated feeds comprising:
a first syndicated feed that comprises a billing statement;
a second syndicated feed that comprises an Internet based web feed and is distributed publicly;
a third syndicated feed that comprises an Electronic Programming Guide;
a fourth syndicated feed that comprises a video feed;
a fifth syndicated feed that comprises an audio feed;
a sixth syndicated feed that comprises a video feed and an audio feed; and
a seventh syndicated feed that comprises an alert; and
providing an indicator, on a remote control device, indicating that the at least one syndicated feed in the user's list of syndicated feeds has been updated.

2. A method of supporting content syndication to a set top box, wherein a syndicated feed is distributed to the set top box that subscribes to the syndicated feed, the method comprising:
maintaining a list of syndicated feeds, the list comprising the syndicated feeds of a video and audio feed, a billing statement feed and an alert feed, the list of syndicated feeds comprises, for at least one of the syndicated feeds, a primary location from which the at least one syndicated feed can be requested and an alternate location from which the at least one syndicated feed can be requested if the at least one syndicated feed is not available at the primary location;
requesting, at the set top box, the at least one syndicated feed at scheduled times;
receiving, at the set top box, the at least one syndicated feed through an Internet Protocol ("IP") network;
providing an indicator, on a remote control device, indicating that the at least one syndicated feed has been updated;
converting, at the set top box, the at least one syndicated feed for use by the set top box; and
causing at least one image to be displayed on a display device for a user, wherein the at least one image is based at least in part on the at least one syndicated feed.

3. The method of claim 2, wherein the image comprises at least a portion of the at least one syndicated feed.

4. The method of claim 3, further comprising: tracking, at the set top box, whether the portion of the at least one syndicated feed has been viewed by the user.

5. The method of claim 2, further comprising providing a user interface for the user to modify the user's list of syndicated feeds.

6. The method of claim 2, further comprising: providing a user interface for the user to specify the location from which the at least one syndicated feed could be requested.

7. The method of claim 2, further comprising:
receiving an input from the user, via the user interface, at the set top box; and
requesting the at least one syndicated feed based on the input both immediately after receiving the input and at regularly scheduled times.

8. The method of claim 2, further comprising:
receiving, at the set top box, the list of syndicated feeds, the list of syndicated feeds comprising:
a description of each syndicated feed in the list of syndicated feeds; and
the location from which each syndicated feed in the list of syndicated feeds could be requested;
providing a user interface for the user to select the at least one syndicated feed from the list of syndicated feeds; and
adding the selected at least one syndicated feed to a user's list of syndicated feeds.

9. The method of claim 2, wherein the at least one syndicated feed comprises an Internet based web feed that is distributed publicly.

10. The method of claim 2, wherein the at least one syndicated feed comprises an Electronic Programming Guide.

11. The method of claim 10, wherein converting the at least one syndicated feed to be used by the set top box comprises:
retrieving a list of preferred programming channels and a layout that is modifiable by the user; and
formatting the Electronic Programming Guide according to the list of preferred programming channels and the layout.

12. The method of claim 2, wherein:
the at least one syndicated feed comprises a video feed; and
a plurality of images is displayed for the video feed.

13. The method of claim 2, wherein the at least one syndicated feed comprises Pay-Per-View programming.

14. The method of claim 2, wherein the at least one syndicated feed comprises Video-On-Demand programming.

15. The method of claim 2, wherein the at least one syndicated feed comprises an audio feed, the method further comprising playing an audio stream based at least in part on the at least one syndicated feed, and wherein the image is associated with the audio stream.

16. The method of claim 2, wherein the at least one syndicated feed comprises a news alert.

17. The method of claim 2, further comprising: sending an instant message to notify the user of the update in the at least one syndicated feed.

18. The method of claim 3, wherein the portion of the at least one syndicated feed that is displayed on the display device comprises a notification of the update in the at least one syndicated feed.

19. The method of claim 2, further comprising: performing a personalized search at a master controller, wherein the at least one syndicated feed comprises a result of the personalized search.

20. The method of claim 2, wherein the at least one syndicated feed comprises a video recording instruction, the method further comprising transmitting the video recording instruction to a digital video recorder.

21. The method of claim 20, wherein the set top box comprises the digital video recorder.

22. A device for receiving a syndicated feed, the device comprising:
a processor; and
a computer readable medium in communication with the processor, the computer readable medium having encoded thereon a set of instructions executable by the device to perform one or more operations, the set of instructions comprising:

instructions for maintaining a list of syndicated feeds, the list comprising the syndicated feeds of a video and audio feed, a billing statement feed and an alert feed, the list of syndicated feeds comprises, for at least one of the syndicated feeds, a primary location from which the at least one syndicated feed can be requested and an alternate location from which the at least one syndicated feed can be requested if the at least one syndicated feed is not available at the primary location;

instructions for requesting the at least one syndicated feed at scheduled times;

instructions for receiving, at the device, the at least one syndicated feed through an Internet Protocol ("IP") network;

instructions for providing an indicator, on a remote control device, indicating that the at least one syndicated feed has been updated;

instructions for converting, at the device, the at least one syndicated feed for use by the device; and instructions for causing at least one image to be displayed on a display device for a user, wherein the at least one image is based at least in part on the at least one syndicated feed.

23. A system for supporting content syndication to a set top box, wherein a syndicated feed is distributed to the set top box that subscribes to the syndicated feed, the system comprising:

a display device;

a master controller; and the set top box configured to:

maintain list of syndicated feeds, the list comprising the syndicated feeds of a video and audio feed, a billing statement feed and an alert feed, the list of syndicated feeds comprises, for at least one of the syndicated feeds, a primary location from which the at least one syndicated feed can be requested and an alternate location from which the at least one syndicated feed can be requested if the at least one syndicated feed is not available at the primary location;

request the at least one syndicated feed at scheduled times;

receive the at least one syndicated feed through an Internet Protocol ("IP") network;

provide an indicator, on a remote control device, indicating that the at least one syndicated feed has been updated;

convert the at least one syndicated feed for use by the set top box; and cause at least one image to be displayed on a display device for a user, wherein the at least one image is based at least in part on the at least one syndicated feed.

24. A non-transitory computer readable medium having encoded thereon a computer program comprising a set of instructions that are executable by a computer system to perform one or more operations to support content syndication to a set top box, wherein a syndicated feed is distributed to the set top box that subscribes to the syndicated feed, the set of instructions comprising:

instructions for maintaining a list of syndicated feeds, the list comprising the syndicated feeds of a video and audio feed, a billing statement feed and an alert feed, the list of syndicated feeds comprises, for at least one of the syndicated feeds, a primary location from which the at least one syndicated feed can be requested and an alternate location from which the at least one syndicated feed can be requested if the at least one syndicated feed is not available at the primary location;

instructions for requesting, at the set top box, the at least one syndicated feed at scheduled times;

instructions for receiving, at the set top box, the at least one syndicated feed through an Internet Protocol ("IP") network;

instructions for providing an indicator, on a remote control device, indicating that the at least one syndicated feed has been updated;

instructions for converting, at the set top box, the at least one syndicated feed for use by the set top box; and instructions for causing at least one image to be displayed on a display device for a user, wherein the at least one image is based at least in part on the at least one syndicated feed.

* * * * *